US007832695B2

(12) United States Patent
Ebel et al.

(10) Patent No.: US 7,832,695 B2
(45) Date of Patent: Nov. 16, 2010

(54) BENDABLE POST

(75) Inventors: Thomas A. Ebel, West Olive, MI (US);
Brian Kronenmeyer, Zeeland, MI (US)

(73) Assignee: Flexpost, Inc., Holland, MI (US)

( * ) Notice: Subject to any disclaimer, the term of this patent is extended or adjusted under 35 U.S.C. 154(b) by 353 days.

(21) Appl. No.: 11/692,583

(22) Filed: Mar. 28, 2007
(Under 37 CFR 1.47)

(65) Prior Publication Data
US 2008/0067299 A1 Mar. 20, 2008

Related U.S. Application Data

(60) Provisional application No. 60/786,512, filed on Mar. 28, 2006.

(51) Int. Cl.
*A45F 3/44* (2006.01)

(52) U.S. Cl. .......................... 248/156; 248/900; 40/608; 52/98; 403/2

(58) Field of Classification Search .................. 248/900, 248/548, 511, 519, 909, 550, 156, 545, 530, 248/160; 40/606.01, 607.01, 612, 608; 403/2; 52/98
See application file for complete search history.

(56) References Cited

U.S. PATENT DOCUMENTS

| 2,141,067 | A | * | 12/1938 | Miller | .......................... | 52/113 |
|---|---|---|---|---|---|---|
| 2,193,747 | A | | 3/1940 | Thompson | | |
| 2,254,566 | A | * | 9/1941 | Cornell, Jr. | .................. | 464/57 |
| 2,283,607 | A | * | 5/1942 | Ludwig | ...................... | 181/237 |
| 2,286,959 | A | * | 6/1942 | Haines | ......................... | 52/113 |
| 2,949,324 | A | | 8/1960 | Birge et al. | | |
| 3,349,531 | A | * | 10/1967 | Watson | ........................ | 52/296 |
| 3,628,296 | A | * | 12/1971 | Henry | ........................... | 52/98 |
| 3,875,720 | A | | 4/1975 | Russell | | |
| 3,912,405 | A | * | 10/1975 | Katt | ............................... | 403/2 |
| 4,126,403 | A | * | 11/1978 | Sweeney et al. | ............... | 403/2 |
| 4,133,125 | A | | 1/1979 | Lariosa | | |
| 4,171,919 | A | | 10/1979 | Willis | | |
| 4,759,161 | A | * | 7/1988 | Kucyk et al. | .................... | 52/99 |
| 4,792,088 | A | | 12/1988 | Bonnell | | |
| 4,806,046 | A | | 2/1989 | Clark | | |
| 4,850,565 | A | * | 7/1989 | Moreno | ...................... | 248/545 |
| 4,923,319 | A | * | 5/1990 | Dent | ............................. | 403/2 |
| 4,926,592 | A | * | 5/1990 | Nehls | ............................ | 52/98 |
| 5,125,194 | A | * | 6/1992 | Granger | ......................... | 52/98 |
| 5,160,111 | A | * | 11/1992 | Hugron | ....................... | 248/548 |
| 5,207,175 | A | * | 5/1993 | Andonian | .................... | 116/209 |
| 5,207,377 | A | * | 5/1993 | Brecht | .......................... | 232/17 |
| 5,214,886 | A | * | 6/1993 | Hugron | ........................... | 52/98 |

(Continued)

*Primary Examiner*—Kimberly T Wood
(74) *Attorney, Agent, or Firm*—Waters & Associates; John A. Waters

(57) ABSTRACT

A bendable mailbox or sign post comprises a foundation defined at one of a dirt, a concrete, and an asphalt surface. A top assembly releasably couples with the foundation and has a plate and a stub extending upward from the plate. The elongated post extends vertically from a bottom end connected with the top assembly. A resilient interconnection is provided between the post and the top assembly, whereby the post pivots about the bottom end and deflects from its vertical orientation when a lateral force is applied to the post and the post returns to the vertical orientation when no lateral force is applied. A frangible interconnection may be provided between the resilient interconnection member and one of the post and the stub.

5 Claims, 20 Drawing Sheets

U.S. PATENT DOCUMENTS

| | | | |
|---|---|---|---|
| 5,215,283 A * | 6/1993 | Gould | 248/145 |
| 5,484,217 A * | 1/1996 | Carroll | 403/2 |
| 5,860,253 A * | 1/1999 | Lapointe | 52/98 |
| 6,223,982 B1 * | 5/2001 | Dunn | 232/39 |
| 6,237,268 B1 * | 5/2001 | Levin | 40/608 |
| 6,250,835 B1 * | 6/2001 | Chamel | 403/2 |
| 6,267,529 B1 | 7/2001 | Mudryk et al. | |
| 6,308,927 B1 * | 10/2001 | Leahy | 248/548 |
| 6,390,436 B2 * | 5/2002 | Barnes et al. | 248/548 |
| 6,422,783 B1 * | 7/2002 | Jordan | 404/9 |
| 6,540,196 B1 * | 4/2003 | Ellsworth | 248/548 |
| 6,560,906 B1 * | 5/2003 | Hillstrom | 40/607.01 |
| 6,626,410 B2 * | 9/2003 | Marcotte et al. | 248/548 |
| 6,679,469 B1 * | 1/2004 | Vega | 248/548 |
| 6,959,902 B2 * | 11/2005 | Leahy | 248/548 |
| 7,108,445 B2 * | 9/2006 | Henriques | 403/202 |
| 2002/0096617 A1* | 7/2002 | Marcotte et al. | 248/548 |
| 2002/0121035 A1* | 9/2002 | Dicke et al. | 40/610 |
| 2003/0205006 A1* | 11/2003 | Conner et al. | 52/98 |

* cited by examiner

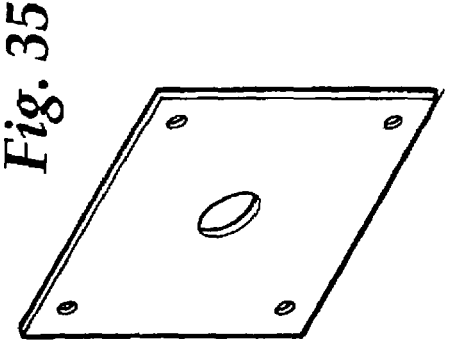
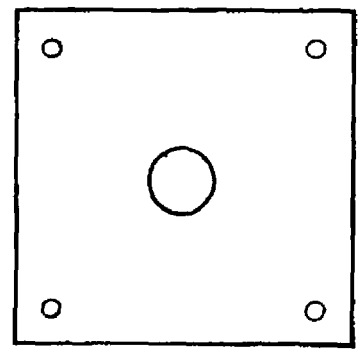

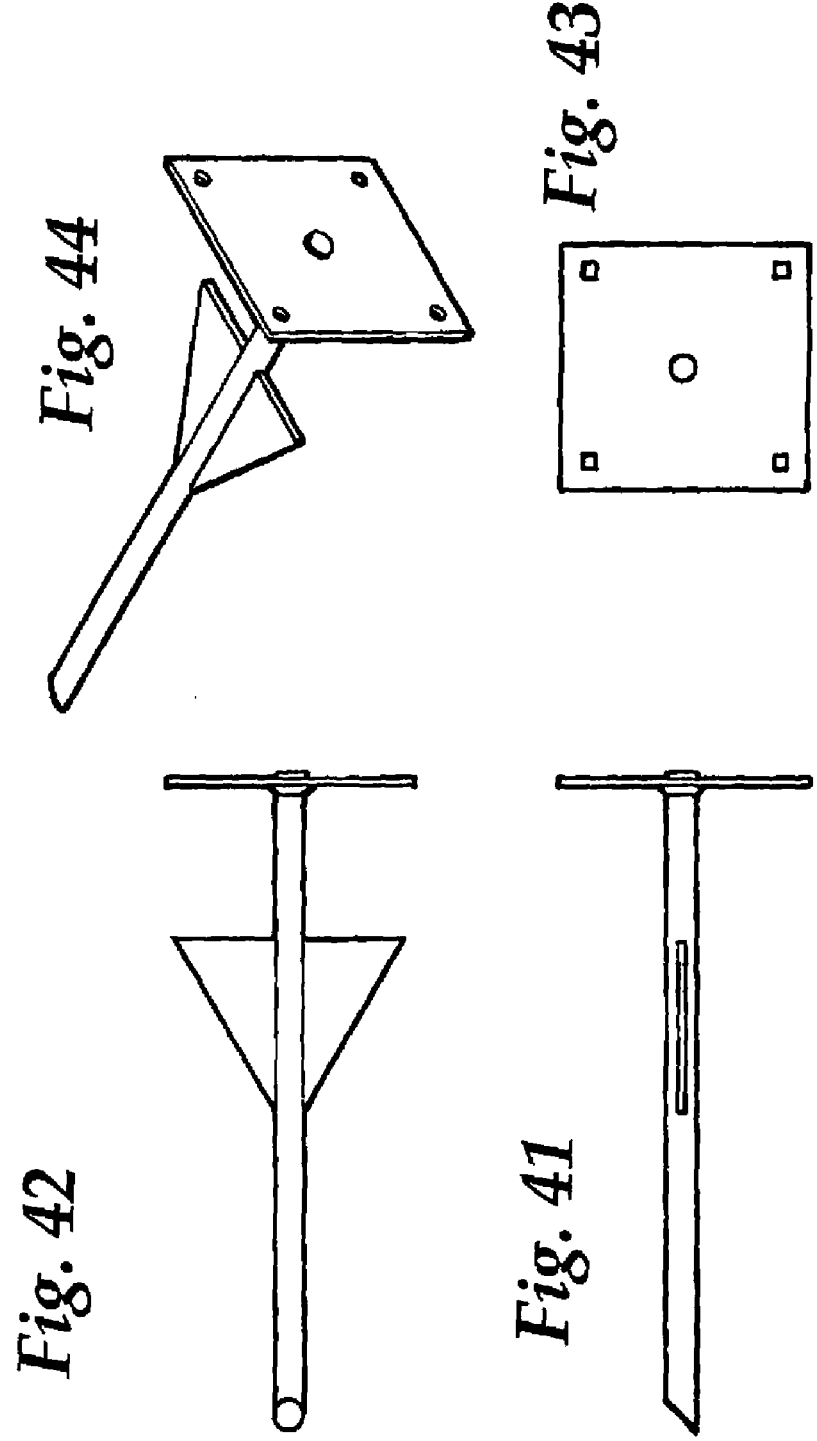

BENDABLE POST

CROSS-REFERENCE TO RELATED APPLICATIONS

This application is based on and claims the priority date of Applicant's co-pending U.S. Provisional Patent Application Ser. No. 60/786,512, entitled BENDABLE POST and filed on Mar. 28, 2006, by Thomas A. Ebel and Brian Kronenmeyer, the disclosure of which is incorporated herein by reference.

BACKGROUND OF THE INVENTION

The invention relates to sign posts, mailbox posts, and the like. More specifically, the invention includes a damage resistant flexible post mount that provides a stable post mount, which deflects under lateral loading, such as being pushed by a vehicle, and returns to its unloaded, upright condition.

Vehicle damage to sign posts and the like is commonly known and frequently occurs in many varied situations, which accumulates into a significant expense to repair damages and broken signage. Conversely, damage from vehicle and sign encounters also results in expensive damages to the vehicles.

While attempts have been made to address the issue of damage to signs by vehicles and to vehicles by signs, the previous suggestions have typically attempted to shift the damage to the sign in order to save the vehicle or attempted to develop resilient signage. These attempts have generally resulted in "disposable" signage that is sacrificed in deference to the vehicle, with associated shift of expense to replacement signage. Alternatively, the result has been compromised signage that may, at best, not shift cost to the signage, but also does not provide acceptable sign performance, including signs that may wobble or not stand.

BRIEF SUMMARY OF THE INVENTION

Accordingly, a bendable post of the invention provides an unique answer to the dilemma of impact damage to sign and mailbox posts and the like, with a sturdy and resilient post mount that diminishes post and vehicle damage and costs, is economical to use, and provides desirable performance in various environments.

In some aspects of the invention, the post is provided with a resilient foundation assembly whereby the post may pivot and deflect from a generally vertical orientation when a lateral force is applied to the post and the post may return to the generally vertical orientation when no lateral force is applied to the post. The foundation assembly including a foundation, a top assembly, and a resilient interconnection between the post and the top assembly.

In other aspects of the invention, the a foundation may be defined at one of a dirt, a concrete, and an asphalt surface. The top assembly may releasably couple with the foundation. The top assembly may include a plate and a stub that extends generally vertically upward from the plate. A resilient interconnection may be provided between the top assembly and the post. Further, a frangible interconnection may be provided between the resilient interconnection member and one of the post and the stub.

These and other features, objectives, and benefits of the invention will be recognized by one having ordinary skill in the art and by those who practice the invention, from this disclosure, including the specification, the claims, and the drawing figures.

BRIEF DESCRIPTION OF THE SEVERAL VIEWS OF THE DRAWING

FIG. 32 is a plan view of a top plate assembly of a bendable post of the invention;

FIG. 33 is an edge view thereof;

FIG. 34 is another edge view thereof;

FIG. 35 is a perspective view thereof;

FIG. 41 is a side elevation of the dirt base assembly thereof;

FIG. 42 is another side elevation thereof;

FIG. 43 is a top plan view thereof;

FIG. 44 is an upper perspective view thereof;

DETAILED DESCRIPTION OF THE INVENTION

Figure 2:
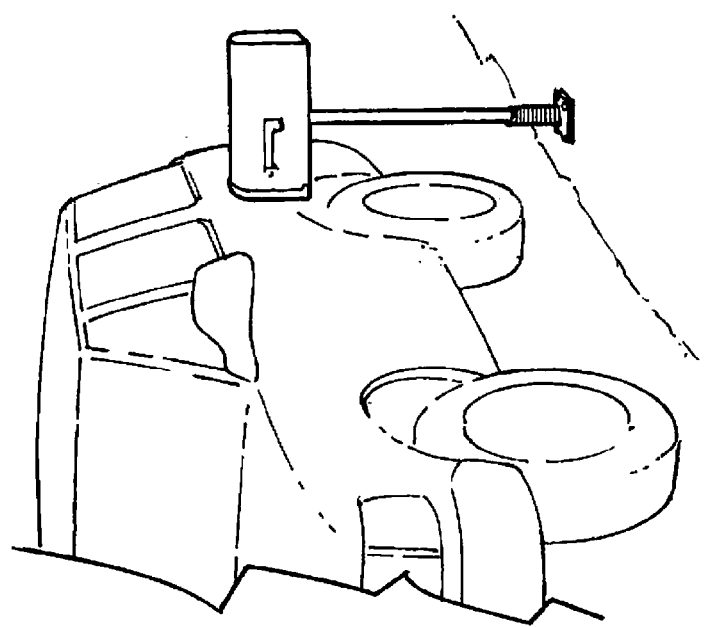
FIG. 2 is a fragmentary perspective view showing a bendable post of the invention in a mailbox post installation.
Figure 1:
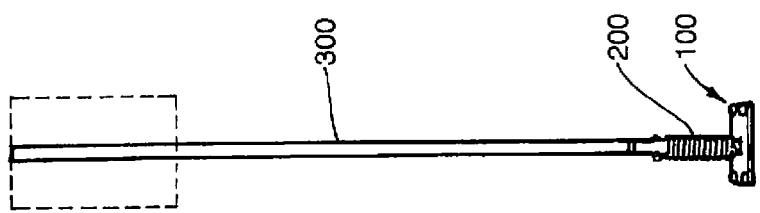
FIG. 1 is a front elevation view of a bendable post of the invention, showing an information sign.
Figure 4:
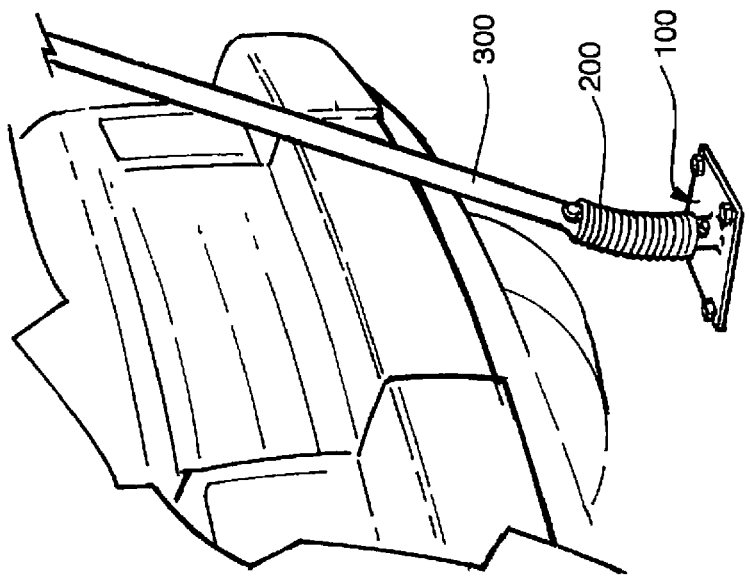
FIG. 4 is a right rear perspective view thereof.
Figure 3:
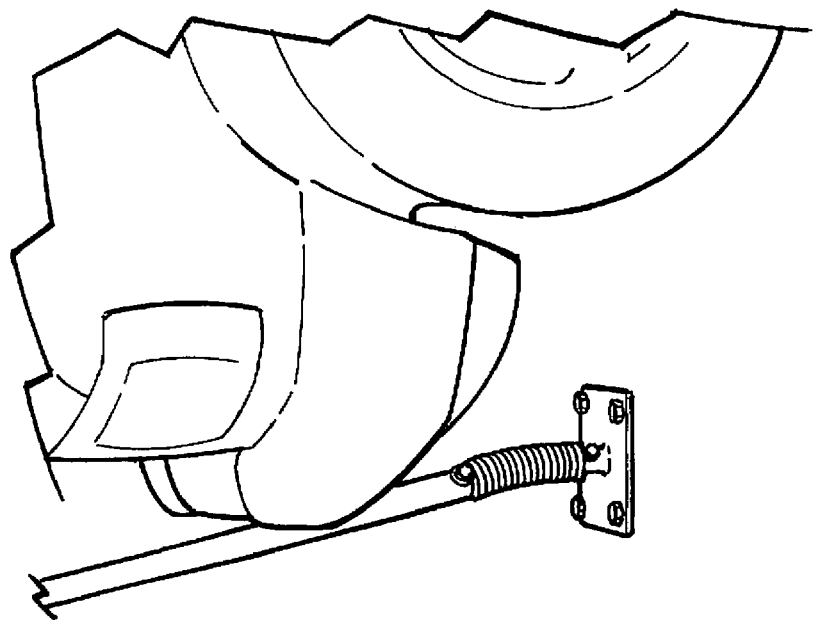
FIG. 3 is a left-side perspective view of a bendable post of the invention, showing a pavement mounted post bent by a vehicle.
Figure 6:
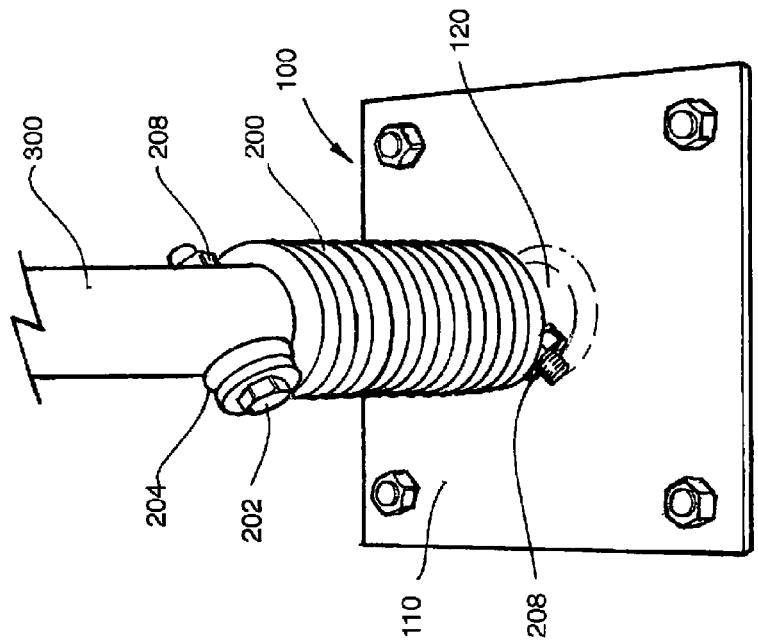
FIG. 6 is an upper front perspective view thereof.
Figure 5:
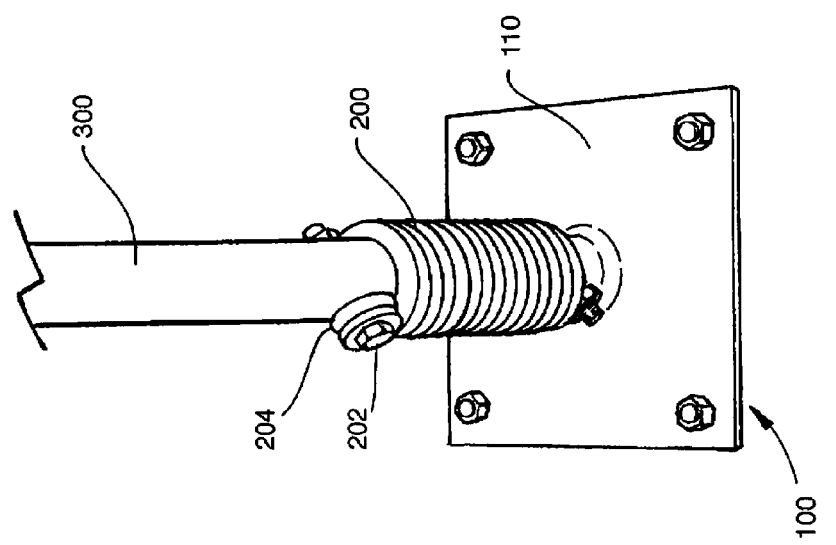
FIG. 5 is an upper front left perspective view of a base plate thereof.
Figure 8:
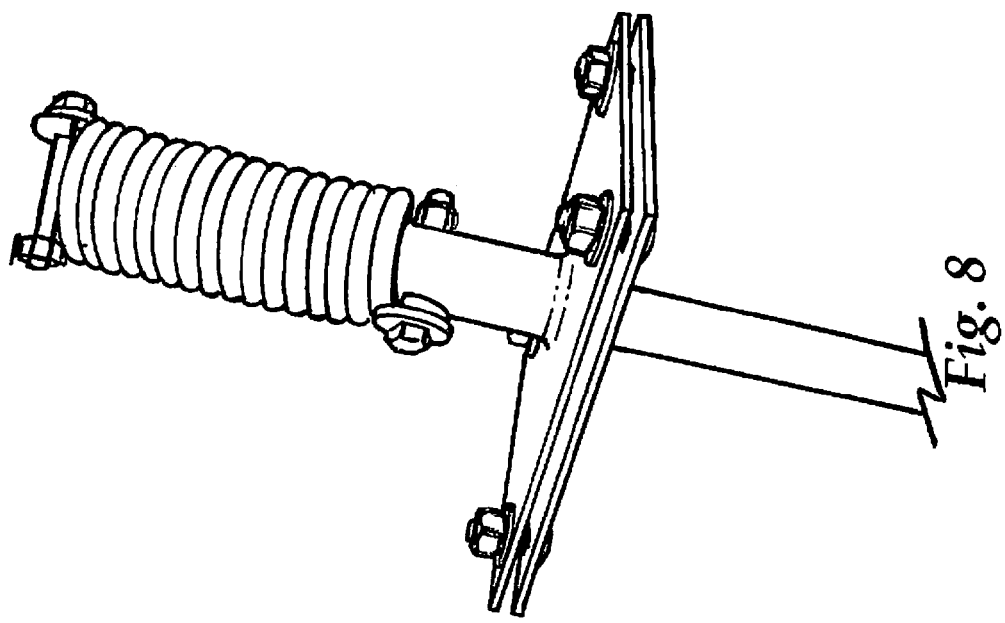
FIG. 8 is an enlarged fragmentary perspective view detail thereof.
Figure 7:
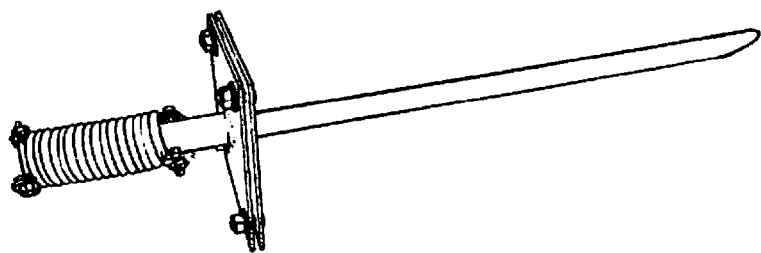
FIG. 7 is a perspective view of a pavement post assembly with top plate assembly and spring of a bendable post of the invention.
Figure 10:
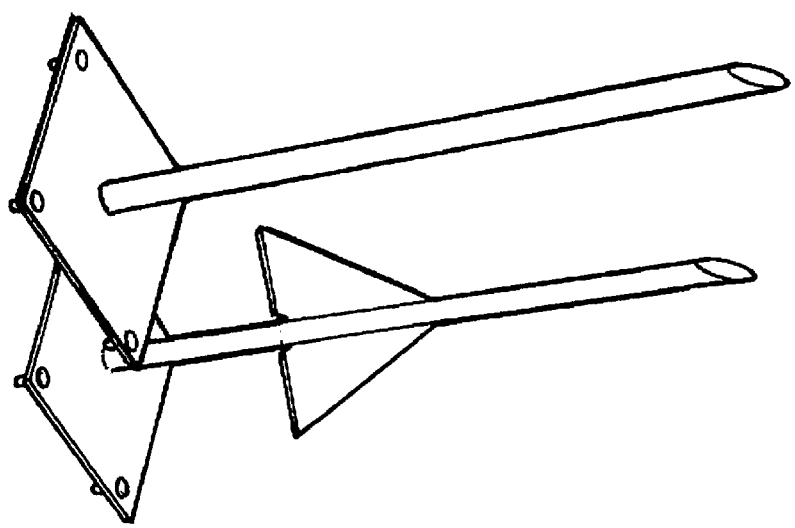
FIG. 10 is a lower perspective view of each of a pavement post base assembly and a dirt post base assembly of a bendable post of the invention.
Figure 9:
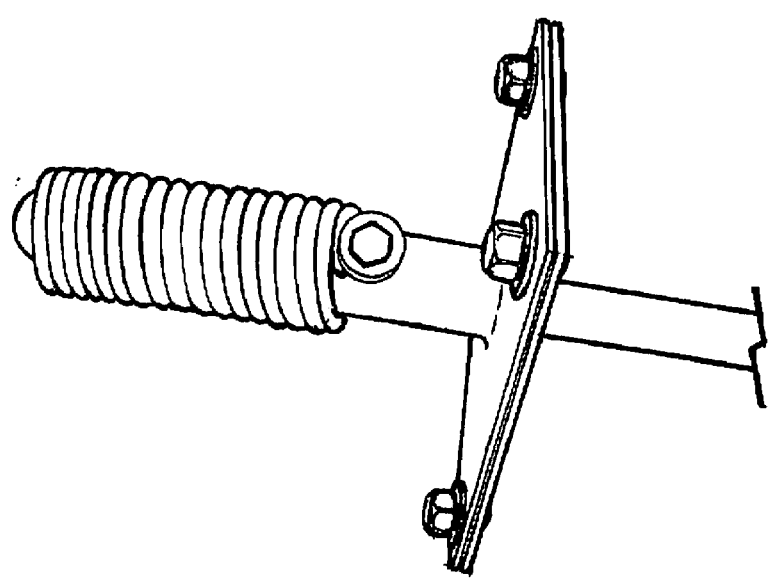
FIG. 9 is another enlarged fragmentary perspective view detail thereof.
Figure 12:
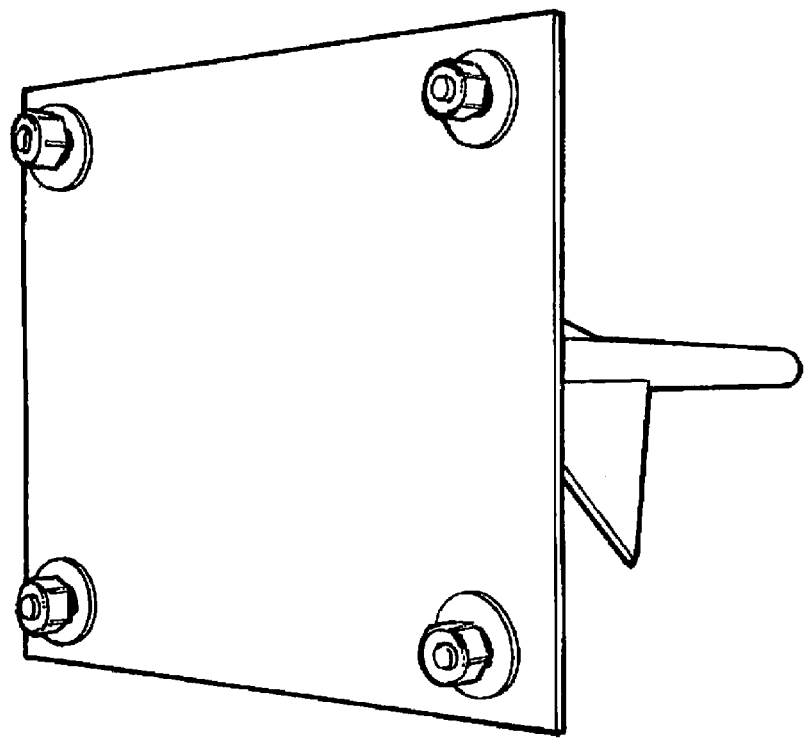
FIG. 12 is another upper perspective view thereof.
Figure 11:
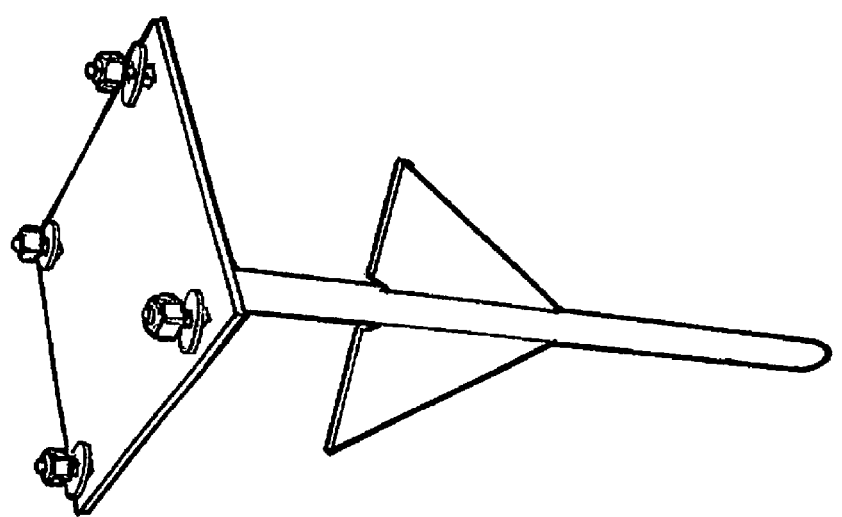
FIG. 11 is an upper perspective view of the dirt post base assembly thereof.

A preferred embodiment of a bendable post according to the invention is generally shown in the drawing figures and discussed below. A bendable post of the invention may be utilized in various installations including a mailbox post (FIGS. 2 and 49-52), a pavement placed sign post (FIGS. 1, 3-10, and 14-39), and a dirt placed sign post (FIGS. 10-13, 20-23, and 32-48).

Addressing the common components of the various bendable post adaptations, each bendable post has a foundation assembly, a top assembly 100, a helical coil spring 200 (FIGS. 55-58), and an upper post 300. The foundation assembly may vary according to specific mounting situations.

The upper post 300 may be of any suitable construction for a sign application or the like of interest and in the present example may include a 1.625 inch (41.3 mm) outside diameter SS20 galvanized steel post (FIGS. 1-6, 15, and 40). Various color treatments may be optionally applied, including painting, powder coating, and sheathing as is understood by one having ordinary skill in the art.

The upper post is fitted closely in the coil spring 200. Consistent with the example tube 300, the spring may have an inside diameter of about 1.66 inch (42.2 mm). Various constructions may be used for the spring 200 and use of a 0.437 (11.1 mm) carbon steel wire has been found to provide good performance. One having ordinary skill in the art understands that different finishes and coatings may be applied to the spring and that materials and dimensions may be modified, all with beneficial and detrimental results as to durability and stiffness and the like.

The spring 200 may overlap the post 300 in various amounts depending upon various factors, including a user's desired result and actual post and spring dimensions. A range of about 1-3 inches (25-76 mm) may cover most installations. While various methods may be used to connect the spring and the post, including welding and adhesives, a loop 204 and 206 respectively, is more preferably formed at each opposing end of the spring and the spring is bolted together with the tube using a bolt 202. In keeping with the example tube 300, the loop may be adapted for slip fit of a 0.562 inch (14.28 mm) bolt through the loop. Of course, the post 300 is most preferably predrilled for slip fit of the bolt through the post (FIGS. 5, 6, 15, and 40). Further, the bolt is positioned at a spacing from the end of the post according to a preselected amount of overlap of the spring over the post. Standard washers are preferably used at each end of the bolt and the bolt may be secured in place with a variety of fasteners. A lock nut 208 may be preferred.

The fabrication of the bolt 202 may be dictated by various factors, including strength and durability. Some anticipated fabrications include stronger materials like common mild steel, which is commonly found at a hardware store, and more frangible materials like aluminum and plastics. A frangible bolt may be desired in installations where particular circumstance heighten safety or damage considerations. Thus, a "shear pin" effect at the bolt may be provided with softer or more frangible bolt fabrication.

Two opposing ends of the spring 200 may be constructed substantially the same for simplicity. Thus, having discussed connection of the spring 200 with the post 300 at one of the opposing ends of the spring, the second of the spring ends is connected with the top assembly 100 in similar manner. More specifically, the top assembly is provided with a plate 110 and a stub tube 120. The plate may be a mild steel square with an about 9-9.5 inch (229-241 mm) side and an about 0.1875 to 0.25 inch (4.76-6.35 mm) thickness to keep in scale with the example post 300.

The stub tube 120 mirrors the post 300, being a length of 1.625 inch (41.3 mm) outside diameter SS20 tube. A length of about 3.5 inches (89 mm) for the tube 120 has been found to provide sufficient length for assembly, for maintenance, and for proper positioning of the spring 200, that is, positioning of the flex point of the bendable post. As with the amount of overlap of the spring over the post, the length of the stub tube may also vary. The stub tube may conveniently be welded with the plate 110 and extend perpendicularly from one side of the plate.

Again, the spring preferably connects with the stub 120 substantially as with the post 300. The spring 200 mates in slip fit engagement with the stub and may preferably overlap the stub 120 about two inches (50.8 mm), although this may be found to more preferably be anywhere in a range of about 1-3 inches (25-76 mm) as discussed above regarding the overlap of the spring on the post 300. The stub tube 120 and the spring are bolted together with the tube using a bolt 212. The stub is, therefore, pre-drilled for slip fit of the bolt through the stub. As with the spring loop 204 at the opposite spring end, the bolt also slip fits through a twin of the opposite spring loop 214. Further, the bolt 212 may be identical to the bolt 202. Although, consideration may be given to whether each, only one, or neither of the bolts provides "shear pin" protection as discussed above.

More specifically, as to the spring 200, an overall length of the spring may be determined in part by post bendability characteristics. A more rigid coupling of the post 300 with the top plate assembly 100 is provided with the upper post 300 and the stub tube 120 abutting one another. Given the spring overlapping each of the post and the tube about two inches (50.8 mm), the spring would have a length of about four inches (101.6 mm). There is potential, however, for deformation of the upper post end and to the stub tube in this configuration. The spring may also experience a plastic deformation.

Alternatively, and perhaps at the other end of the spectrum, the upper post 300 may be spaced from the stub tube 120, so at least about five spring coils are between the post and the tube. For the example spring 200, this would be a space between the post and the tube of about 2.185 inch (55.5 mm) with a resulting spring length of at least about six inches (152 mm).

Figure 54:
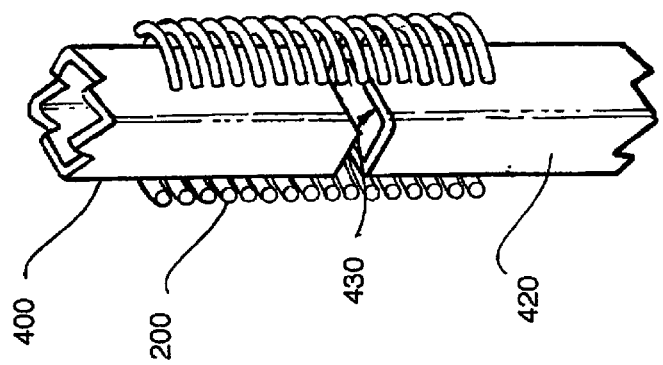
FIG. 54 is another fragmentary orthogonal view thereof.
Figure 53:
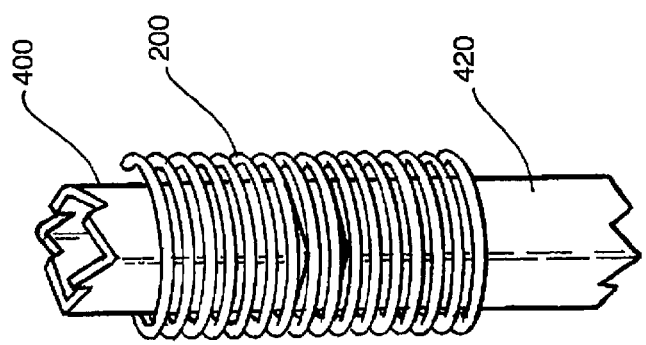
FIG. 53 is a fragmentary orthogonal view of an alternative embodiment of the invention, showing use of a square tubing upper post.
Figure 58:
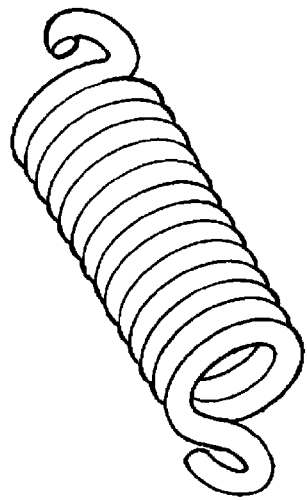
FIG. 58 is an orthogonal projection thereof.
Figure 57:
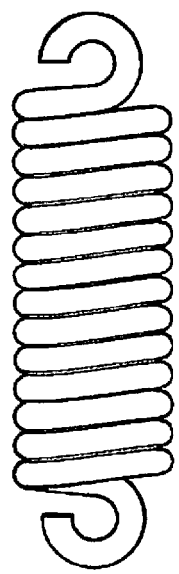
FIG. 57 is another side elevation view thereof.
Figure 56:
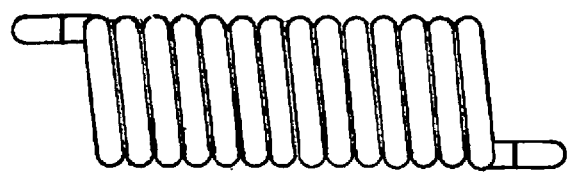
FIG. 56 is a side elevation view thereof.
Figure 55:
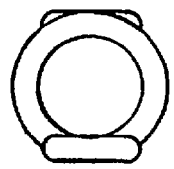
FIG. 55 is an end plan view of a helical coil spring of the invention, the opposite end being a duplicate image thereof.

In a first alternative configuration of the post assembly, each of the cylindrical upper post 300 and the cylindrical stub tube 120 may be replaced with lengths of a square tube, providing post 400 and tube 420 (FIGS. 53 and 54), although one having ordinary skill in the art understands that other tube cross section shapes, including rectangular and oval, may be desired under particular circumstances. Further, the square post 400 and the tube 420 may have miter cut ends and abut at a miter cut joint 430, as contrasted with the square cut ends of the post 300 and tube 120, above, although a post of any cross section may have a "mitered" end or interface with its supporting stub tube.

In whatever post and tube configuration, 300 and 120 or 400 and 420, respectively, for example, a number of foundation assemblies may be used for different mounting situations, as suggested above. The foundation assemblies may include a concrete pavement mounting situation (FIGS. 1 and 3-6, 14), an asphalt pavement mounting situation (FIGS. 7-10, and 15-19), a dirt mounting situation (FIGS. 10-13, and 40-48), and a mailbox post mounting situation (FIGS. 2 and 49-52). Each alternative mounting foundation includes a foundation or base plate 500 (FIGS. 24-27) that provides a cooperating base for the plate 110 of the top plate assembly 100. Thus, the base plate 500 may be quite similar to the plate 110 and may be a corresponding mild steel square with a corresponding side of about 9-9.5 inch (229-241 mm) and an about 0.1875 to 0.25 inch (4.76-6.35 mm) thickness to keep in scale with the example. Each of the top plate assembly 100 and the base plate 500 is provided with aligned coupling holes at their respective corners. While the top plate assembly may be drilled for slip fit of cooperating mounting bolts, the base plate may be cut with square holes for convenient use of carriage bolts or the like as shown in the drawing.

Figure 14:
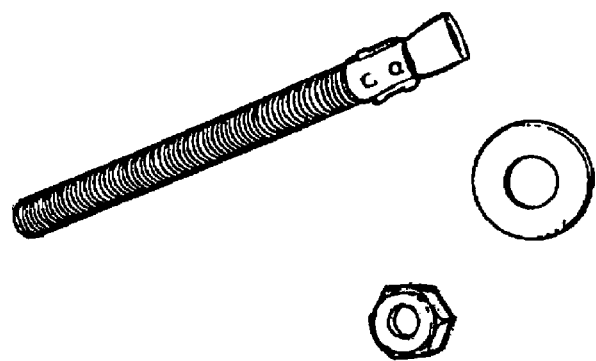
FIG. 14 is a view of components of a concrete mounting kit of a bendable post of the invention, including concrete expandable studs, washers, and nuts.
Figure 13:
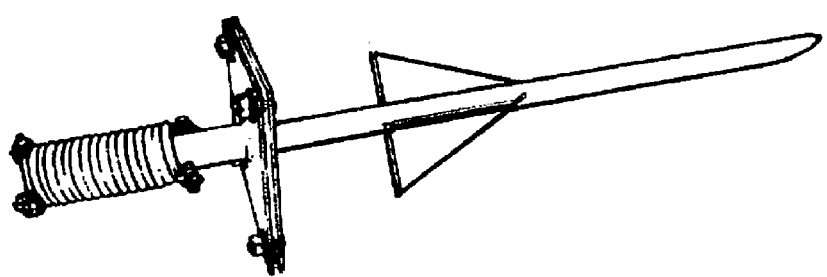
FIG. 13 is a lower perspective view thereof.
Figure 15:
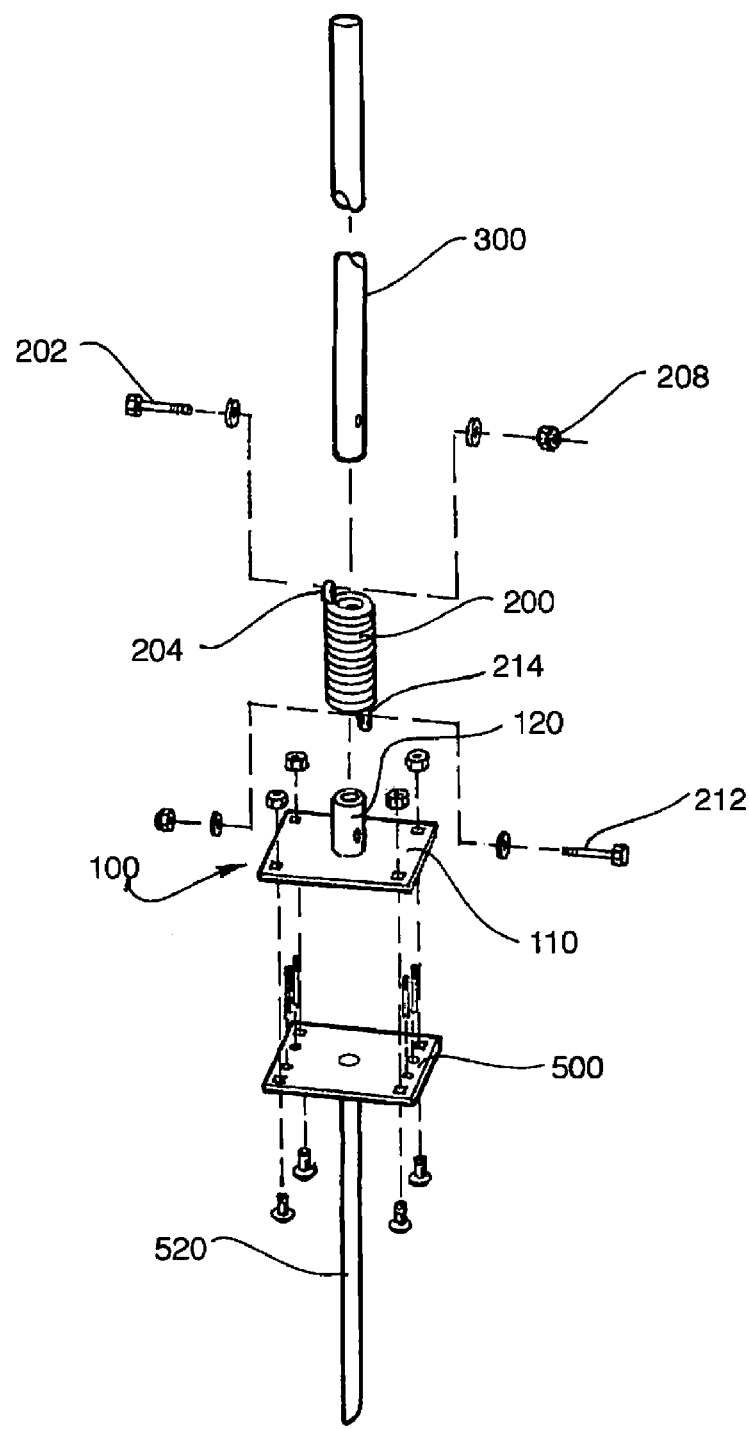
FIG. 15 is a partial fragmentary exploded view of a bendable post of the invention, including pavement post assembly.
Figure 19:
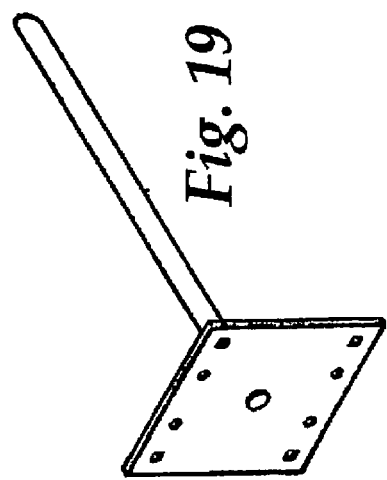
FIG. 19 is a perspective view thereof.
Figure 18:
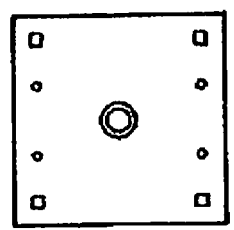
FIG. 18 is a top plan view thereof.
Figure 17:
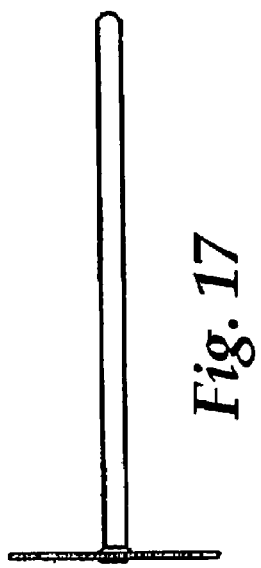
FIG. 17 is another side elevation view thereof.
Figure 16:
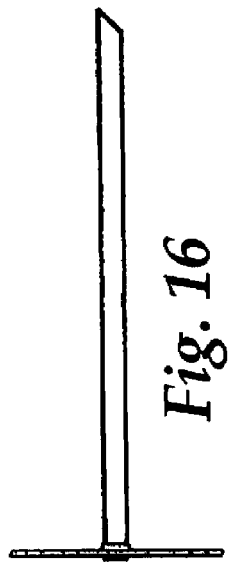
FIG. 16 is a side elevation view of the pavement post assembly thereof.
Figure 23:
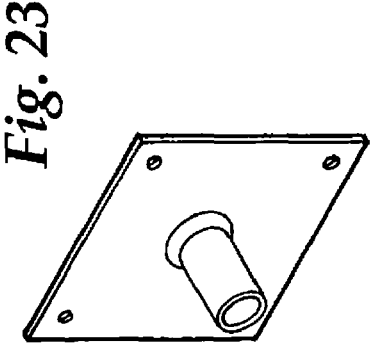
FIG. 23 is a top perspective view thereof.
Figure 22:
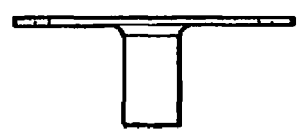
FIG. 22 is another side elevation view thereof.
Figure 21:
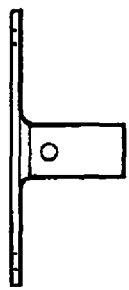
FIG. 21 is a side elevation view thereof.
Figure 20:
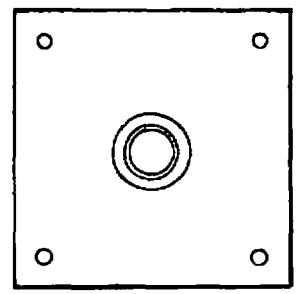
FIG. 20 is a top plan view of a top plate assembly of the bendable post of FIG. 15.
Figure 27:
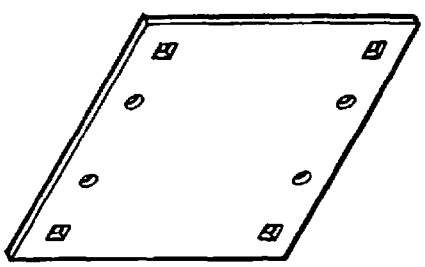
FIG. 27 is a perspective view thereof.
Figure 26:
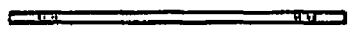
FIG. 26 is another edge view thereof.
Figure 25:
FIG. 25 is an edge view thereof.
Figure 24:
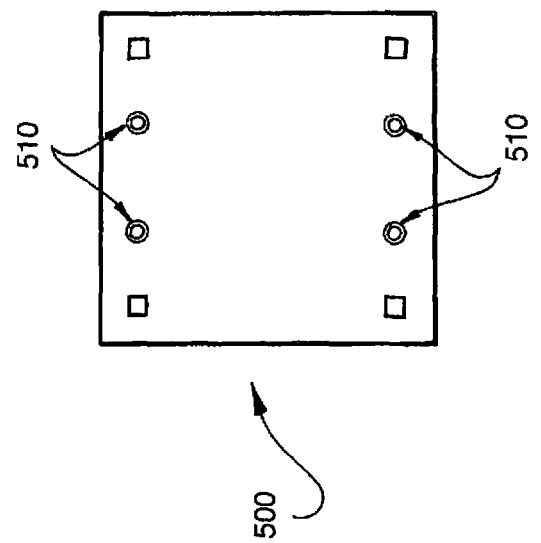
FIG. 24 is a top plan view of a base plate of a pavement post assembly of a bendable post of the invention.
Figure 31:
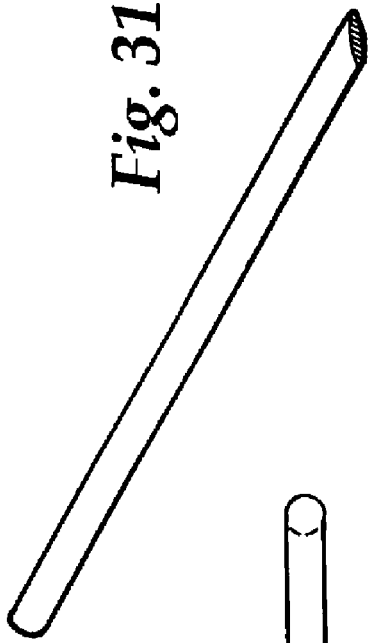
FIG. 31 is a perspective view thereof.
Figure 30:
FIG. 30 is a top plan view thereof.
Figure 29:
FIG. 29 is another side elevation view thereof.
Figure 28:
FIG. 28 is a side elevation view of a base rod of the pavement post assembly.
Figure 39:
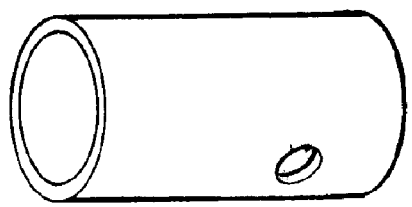
FIG. 39 is a top perspective view thereof.
Figure 38:
FIG. 38 is another side elevation view thereof.
Figure 37:
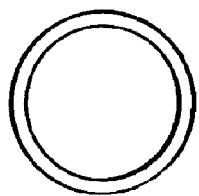
FIG. 37 is a plan view thereof.
Figure 36:
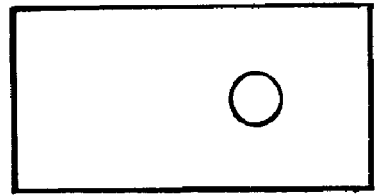
FIG. 36 is a side elevation view of a top plate tube of the top plate assembly.

Relative to concrete pavement mounting, the base plate may further be provided with a set of concrete mounting holes 510 (FIG. 24). The holes 510 are sized and positioned as desired to cooperate with set anchors or bolts. A common variety of concrete anchor is shown in FIG. 14 and may be used as is known by one having ordinary skill in the art.

For asphalt pavement mounting, the base plate may further be provided with a stake 520 that extends perpendicular to and downward from the plate 500 when installed. An about four foot (1219 mm) length of an about one inch (25.4 mm) diameter solid steel rod has been found to provide good foundation stability in context of the present example. The asphalt foundation is easily installed by drilling a hole through the pavement and driving the stake 520 through the asphalt hole until the base plate 500 is seated at the pavement surface. Of course, and end of the rod that is away from the base plate may be beveled or otherwise sharpened to enhance penetration. Again, the base plate is bolted with the top plate assembly 100 as discussed above.

Figure 40:
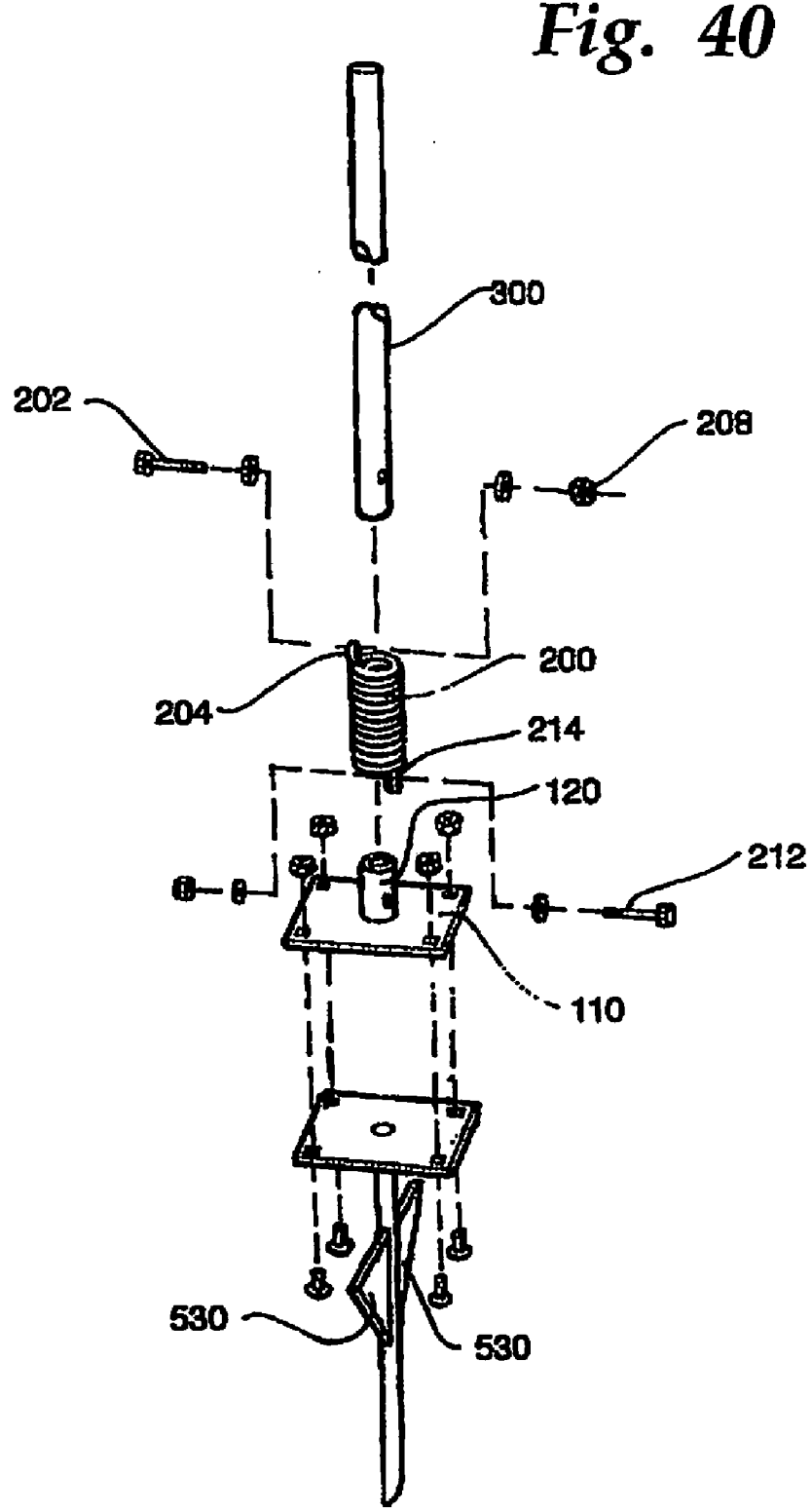
FIG. 40 is a partial fragmentary exploded view of a bendable post of the invention, including a dirt base assembly.
Figure 48:
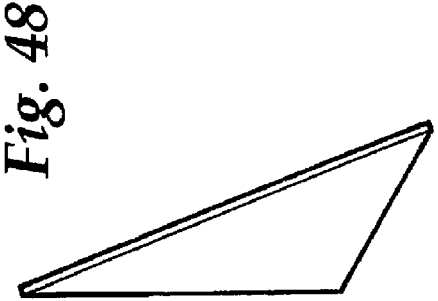
FIG. 48 is a side perspective view thereof.
Figure 47:
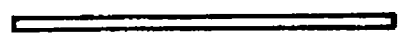
FIG. 47 is another edge view thereof.
Figure 46:
FIG. 46 is an edge view thereof.
Figure 45:
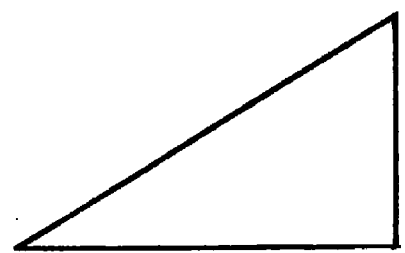
FIG. 45 is a side elevation of a gusset thereof.
Figure 52:
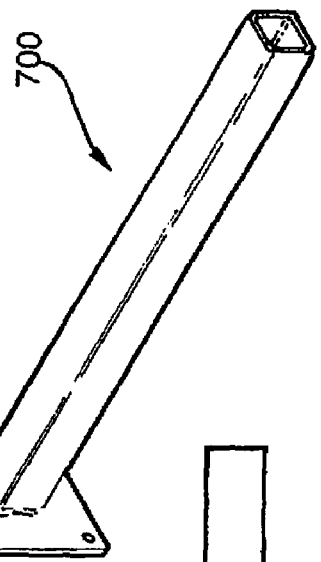
FIG. 52 is a lower perspective view thereof.
Figure 51:
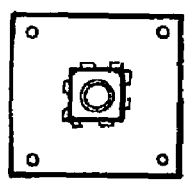
FIG. 51 is a bottom plan view thereof.
Figure 50:
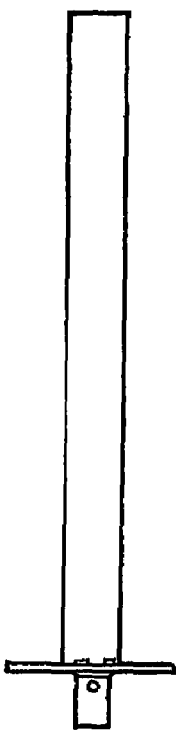
FIG. 50 is another side elevation view thereof.
Figure 49:
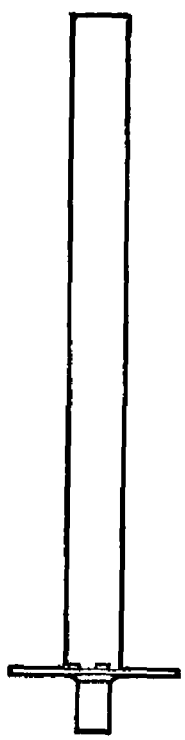
FIG. 49 is a side elevation view of a mail box post assembly base for a bendable post of the invention.

When placing a bendable post of the invention in turf or other dirt environments, the foundation is easily provided with a modification of the above asphalt foundation. For dirt mounting, the asphalt foundation may further be provided with stabilizers 530, including fins as shown (FIG. 40). One having ordinary skill in the art knows that factors such as the number, the size, the shape, and the positioning of the stabilizers may change to adapt the dirt or turf foundation to different soil conditions. An obvious adaptation that the invention anticipates, for example, is use of an auger fin whereby a soil based foundation may be seated into place by screw auger.

Finally, an example of an adapting mailbox foundation 700 to retro-fit a mailbox post installation with a bendable post of the invention is shown in the drawing at FIGS. 49-52. A notable modification as compared with the asphalt foundation is that the stake 520 is replaced with a length of nominal 3×3×11 gauge (0.120 inch) (76×76×3 mm) square tubing 540. The tube may have a length that is sized as desired for local soil and frost considerations as well as for the alternative staking configurations discussed above, namely, the asphalt foundation and the turf foundation. An anticipated range of common lengths for the square tube 540 is about 30 to 48 inches (762-1220 mm), although this is not critical to the invention because experimentation or calculation relative to specific installations may determine an optimal secure foundation for the specific installation.

In an alternative statement, the present invention can be used in connection with signs of a variety of sizes, ranging from the likes of parking space restriction signs, stop signs, and other traffic direction signs to larger roadside signs used for advertising and their like, to smaller signs for particular uses. In the illustrated normal use of a traffic control sign, the support post typically are formed of galvanized steel tubular posts having an external diameter of about 1.66 inches. The post diameter can vary between 1 and 3 inches for a median range of sign sizes and can even be as small as ½ inch for particularly small applications. Posts are formed of galvanized steel or painted steel or other suitably rigid material. The posts typically are round but could be square or other shapes.

In the embodiments of the invention generally illustrated in the drawing, the posts are round, and the upper and lower sections are shown spaced apart by a predetermined distance. A round coil extension spring (with contiguous coils) fits over the upper and lower sections of the post. In a typical installation, a spring 9 inches long is employed, with the spring overlapping the upper and lower post by 3 inches and having a 3-inch section extending between the upper and lower post. The gap between the upper and lower post is important because it provides a number of active coils of the spring, so that the spring can bend over under elastic deformation from a vertical angle preferably to a 90 degree or perpendicular angle with respect to the lower section of the post. In the preferred practice of the present invention, the 3-inch gap between the upper and lower sections of the post provides room for 5 active coils of the 9-inch spring. The spring would work with 2-9 coils or more, and a more preferred range is 3-7 active coils between the upper and lower sections of the post. An excessive number of active coils makes the post less stable and the spring more expensive, while a smaller number of active coils constrains the range of deflection without plastic deformation of the spring.

While the spring desirably may be about 9 inches long, a spring length of 3-15 inches would be operative, and a spring length range of 6-12 inches is a more preferred range. The length of the spring is basically controlled by cost, a longer spring generally being unnecessary. The shorter the spring, the more likely the spring is to plastically deform when bent or to slip off the ends of the post if the spring does not overlap the post adequately.

The gap between the posts desirably is 3 inches but can range from 1-5 inches. A smaller gap may not provide enough active coils to permit a 90 degree bend in the sign without deforming the coils, but it would provide a substantial bend that may be satisfactory under certain conditions.

In order to provide a sign support that does not wobble under normal conditions, a substantially rigid spring is necessary. In the illustrated embodiment, the spring is a closed loop steel spring having a wire diameter of ⅝ inch. A wire diameter of ½ inch or somewhat less will work. A wire diameter of ⅜ inch is generally not satisfactory for a sign of the type illustrated in the present application. A wire diameter of 1 inch or perhaps more may be desirable for large, roadside signs. The wire diameter and number of active coils is selected to provide a sign that is substantially rigid under normal conditions but which deflects readily under impact of a vehicle or the like.

The spike on the bottom of the base desirably is formed of wrought iron or steel but can be formed of any suitably rigid material. The spike can be round, square, or virtually any shape, including hollow. The spike can be from 18-48 inches long, depending upon the application. A longer spike is necessary for a large sign or a loose sandy soil, whereas a shorter spike may be sufficient for a compact clay soil or a lighter weight sign.

One having ordinary skill in the art and those who practice the invention will understand from this disclosure that various modifications and improvements may be made without departing from the spirit of the disclosed inventive concept. One will also understand that various relational terms, including left, right, front, back, top, and bottom, for example, are used in the detailed description of the invention and in the claims only to convey relative positioning of various elements of the claimed invention.

What is claimed is:

1. A bendable post assembly adapted to be mounted on a foundation comprising one of a dirt, a concrete, and an asphalt surface in an area exposed to vehicular traffic, the post assembly comprising:
    a top assembly releasably coupled with the foundation, the top assembly having a base plate and a stub that extends generally vertically upward from the base plate;
    a post that is an elongated member having a top end and an opposite bottom end, the bottom end being aligned with and adjacent to the stub of the top assembly, the post extending generally vertically upward from the bottom end to the top, the post being adapted to connect with and support an object thereon;
    a resilient spring member interconnecting the bottom end of the post and the stub of the top assembly, such that the post resiliently pivots about the bottom end and deflects away from a generally vertical orientation when a lateral force is applied to the post, with the post returning to the generally vertical orientation when no lateral force is applied to the post, the resilient spring member comprising a closed loop coil spring connector having a number of coils at a top end that fit over and circumscribe the bottom end of the post and having a number of coils at an opposite bottom end that fit over and circumscribe the stub, with the post and the stub being spaced apart by a gap of at least one inch and with the spring having at least three coils extending over the gap between the coils at the top and bottom ends of the spring; and
    releasable connectors attaching the resilient spring member to the outer sides of the post and the stub, at least one of the connectors being a frangible connector, such that when an excessive force is applied to the post the frangible connector will break, releasing the resilient spring member before the post components are damaged, the releasable connectors comprising bolts that extend through loops formed in the ends of the resilient spring member and through openings in the post and stub, the bolts engaging nuts on threaded ends of the bolts to securely attach the ends of the resilient spring member to the post and stub, at least one of the bolts being the frangible connector, the frangible connector being of a size and material to break and release the resilient spring member from one of the post and the stub, before the post components are damaged by a bending force, said frangible connector being fabricated from a material comprising aluminum.

2. A bendable post assembly as in claim 1 wherein:
    the surface is a paved surface of the type formed by concrete or asphalt paving;
    the top assembly comprises a generally flat, rigid metal plate that abuts the surface, the stub being formed of metal and being securely attached to the plate such that the plate holds the stub in a perpendicular position with respect to the plate;
    the coil connector being at least three inches long and extending over the stub and post a sufficient distance to maintain the stub and post in vertical alignment in the absence of a lateral force on the post, the coil spring connector extending over the stub and post by at least one inch, the coil spring connector being formed of wire having a diameter of at about one-half inch or more.

3. A bendable post assembly as in claim 2 wherein the bolts attaching the coil spring connector to the stub and post are formed so as to support the weight of the post without breaking but will break before a bending force will injure the post.

4. A bendable post assembly as in claim 2 wherein the top assembly is mounted on the asphalt or concrete surface by bolts that extend through openings in the base plate.

5. A bendable post assembly as in claim 1 wherein the coils of the coil spring connector snugly fit over the end of the post and the stub so as to hold the pole in an erect position until a sideways dislodging force engages the pole.

* * * * *

UNITED STATES PATENT AND TRADEMARK OFFICE
CERTIFICATE OF CORRECTION

PATENT NO. : 7,832,695 B2
APPLICATION NO. : 11/692583
DATED : November 16, 2010
INVENTOR(S) : Thomas A. Ebel and Brian Kronenmeyer Page 1 of 1

It is certified that error appears in the above-identified patent and that said Letters Patent is hereby corrected as shown below:

In the Claims

Column 7, line 34 (Claim 1, Line 12) after the word "top", insert the word --end--.
Column 8, line 29 (Claim 2, line 9) after the word "coil", insert the word --spring--.

Signed and Sealed this
Twenty-second Day of March, 2011

David J. Kappos
*Director of the United States Patent and Trademark Office*